(12) United States Patent
Choi et al.

(10) Patent No.: US 9,310,047 B2
(45) Date of Patent: Apr. 12, 2016

(54) CURVED DISPLAY APPARATUS

(71) Applicant: Samsung Display Co., Ltd., Yongin, Gyeonggi-Do (KR)

(72) Inventors: Kwang-Wook Choi, Cheonan-si (KR); JooYoung Kim, Suwon-si (KR); Chi-O Cho, Asan-si (KR); Insun Hwang, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 415 days.

(21) Appl. No.: 13/860,677

(22) Filed: Apr. 11, 2013

(65) Prior Publication Data

US 2014/0111974 A1    Apr. 24, 2014

(30) Foreign Application Priority Data

Oct. 23, 2012  (KR) .................. 10-2012-0118030

(51) Int. Cl.
| | | |
|---|---|---|
| *G02F 1/1335* | (2006.01) | |
| *F21V 7/04* | (2006.01) | |
| *G09F 13/04* | (2006.01) | |
| *G09F 9/30* | (2006.01) | |
| *F21V 8/00* | (2006.01) | |

(52) U.S. Cl.
CPC . *F21V 7/04* (2013.01); *G02B 6/008* (2013.01); *G02B 6/0061* (2013.01); *G09F 9/30* (2013.01); *G09F 13/04* (2013.01); *G02B 6/0036* (2013.01)

(58) Field of Classification Search
CPC .............. G02F 1/133602; G02F 1/133608; G02F 1/133603; G02F 1/133605; G02F 1/133611; G02B 6/0055; G02B 6/0088; G02B 6/0031; G02B 6/0051; G02B 6/0068; G02B 5/10; G09F 9/35; G09F 13/04; F21V 7/04; F21V 7/09; F21V 7/0008; Y10S 385/901; F21S 48/1388; F21S 48/23; F21Y 2103/003; F21Y 2113/005

USPC .......... 362/23.16–23.19, 23.2, 97.1–97.4, 98, 362/99, 125, 326, 327, 328, 341, 346, 347, 362/540, 543–545, 611–613; 349/58, 62, 349/64, 67, 70

See application file for complete search history.

(56) References Cited

U.S. PATENT DOCUMENTS

| | | | | |
|---|---|---|---|---|
| 7,920,320 | B2 * | 4/2011 | Watson et al. | 359/296 |
| 8,111,347 | B2 * | 2/2012 | Koganezawa | 349/58 |
| 2007/0146569 | A1 * | 6/2007 | Nouchi et al. | 349/58 |
| 2010/0238367 | A1 * | 9/2010 | Montgomery et al. | 349/15 |
| 2010/0328578 | A1 * | 12/2010 | Biernath et al. | 349/64 |
| 2011/0096262 | A1 * | 4/2011 | Kikuchi | 349/58 |
| 2015/0023003 | A1 * | 1/2015 | Fang et al. | 362/97.2 |

FOREIGN PATENT DOCUMENTS

| | | |
|---|---|---|
| KR | 1020110062506 A | 6/2011 |
| KR | 10-1075272 B1 | 10/2011 |
| KR | 1020120026691 A | 3/2012 |
| KR | 1020120031359 A | 4/2012 |
| KR | 1020120043986 A | 5/2012 |
| KR | 10-1171856 B1 | 8/2012 |

* cited by examiner

*Primary Examiner* — Hargobind S Sawhney (74) *Attorney, Agent, or Firm* — Cantor Colburn LLP (57) ABSTRACT

A display apparatus includes a curved display panel having a first curvature; and a plurality of light source units arranged along the first curvature the display panel. Each light source unit includes a reflective part including a reflective upper surface which has a second curvature different from the first curvature of the display panel; and a light source part which is at a first side of the reflective part, and includes a light source which generates and provides a light to the reflective surface.

20 Claims, 7 Drawing Sheets

CURVED DISPLAY APPARATUS

This application claims priority to Korean Patent Application No. 10-2012-0118030, filed on Oct. 23, 2012, and all the benefits accruing therefrom under 35 U.S.C. §119, the contents of which are herein incorporated by reference in their entirety.

BACKGROUND

1. Field

The disclosure relates to a display apparatus. More particularly, the disclosure relates to a curved display apparatus.

2. Description of the Related Art

A liquid crystal display device has been adopted as one flat panel display that is widely used. The liquid crystal display includes a display panel including two substrates respectively provided with electrodes, and a liquid crystal layer interposed between the two substrates to display an image. However, since the display panel is not self-emissive, the liquid crystal display device includes a backlight unit to provide the display panel with light.

The backlight unit is classified into an edge-illumination type backlight unit and a direct-illumination type backlight unit according to the position of a light source thereof. In the edge-illumination type backlight unit, the light source is located adjacent to a side of the display panel, and in the direct-illumination type backlight unit, the light source is located at a rear of the display panel.

The edge-illumination type backlight unit is widely used more than the direct-illumination type backlight unit since the edge-illumination type backlight unit decreases an overall thickness of the liquid crystal display device. A local dimming method that controls brightness at a desired area of plural areas of the display panel has been researched and developed in order to reduce power consumption of the liquid crystal display device.

SUMMARY

One or more exemplary embodiment of the invention provides a curved display apparatus capable of improving an image display quality.

An exemplary embodiment of a display apparatus includes a curved display panel having a first curvature; and a plurality of light source units arranged along the first curvature of the display panel.

Each light source unit includes a reflective part including a reflective upper surface which faces the display panel and has a second curvature different from the first curvature of the display panel; and a light source part which is at a first side of the reflective part, which generates and provides a light to the reflective surface.

A portion of the curved reflective surface is tangent to a curve substantially parallel to the first curvature.

Each light source unit may further include a cover part which surrounds the light source part and reflects the light toward the reflective surface of the reflective part.

An angle between an upper surface of the cover part of a light source unit and an upper surface of the cover part of an adjacent light source unit may be greater than zero degree, and a portion of each of the reflective surfaces of the adjacent light source units is tangent to a curve substantially parallel to the first curvature.

A second side of the reflective part opposite to the first side may overlap the cover part of an adjacent light source. The reflective part may include a recessed portion at the second side thereof, in which the cover part of the adjacent light source unit is accommodated.

The reflective part may further include a lower surface which is opposite to the reflective upper surface and curved along a third curvature different from the first curvature of the display panel.

According to one or more exemplary embodiment described above, an optical sheet of a backlight unit may have the same curvature as that of a display panel by only using a plurality of light source units in the backlight unit, regardless of the flexibility of the optical sheet, to maintain a regular distance between the optical sheet and the light source units. Thus, the optical sheet and the light source units are uniformly arranged along the curvature of the display panel and the light is uniformly supplied to the display panel, thereby improving the image display quality of the display apparatus.

BRIEF DESCRIPTION OF THE DRAWINGS

The above and other advantages of the invention will become readily apparent by reference to the following detailed description when considered in conjunction with the accompanying drawings where:

FIG. 6B is a perspective view showing an exemplary embodiment of a light source shown in

FIG. 6A; and

DETAILED DESCRIPTION

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 1:
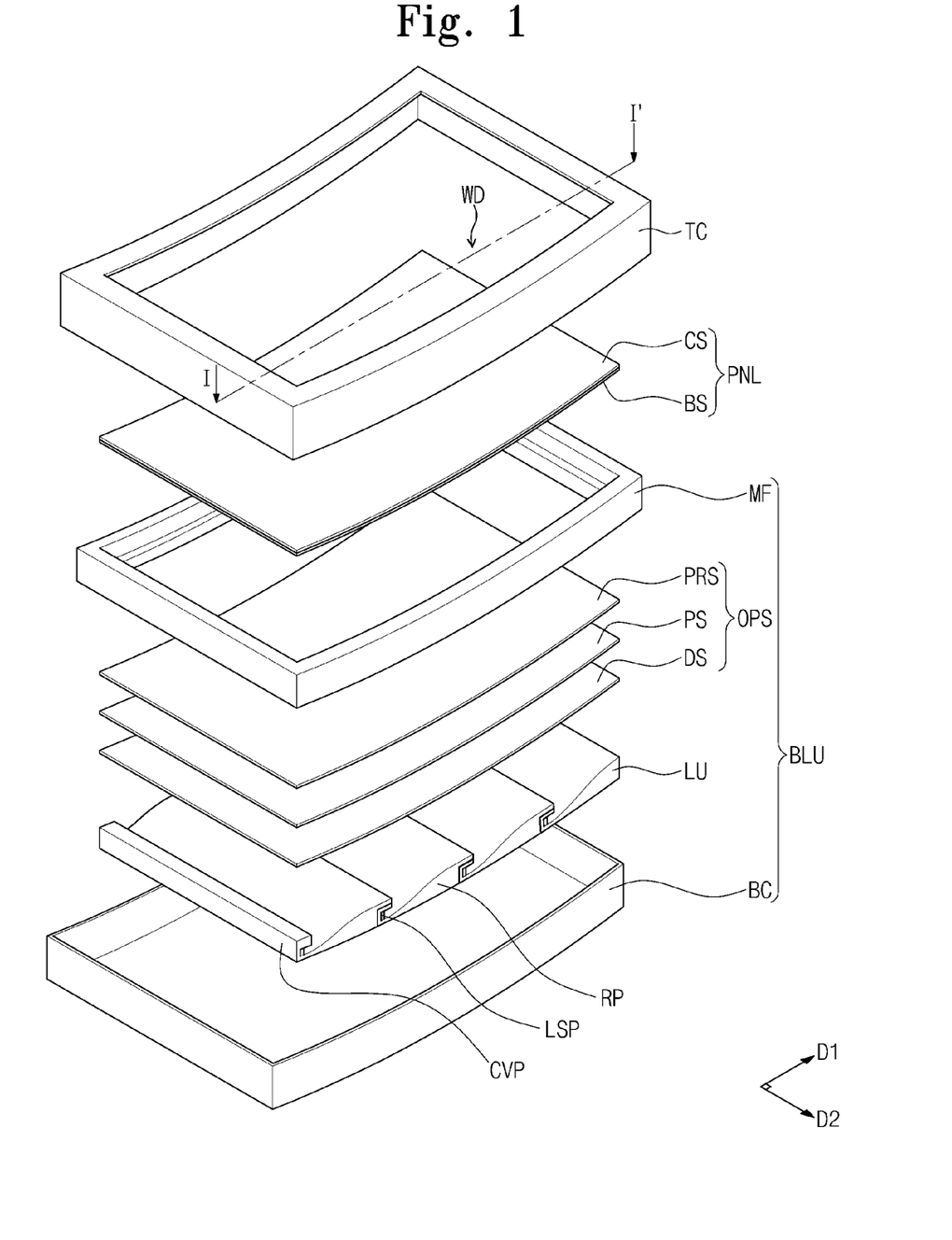
FIG. 1 is an exploded perspective view showing an exemplary embodiment of a display apparatus according to the invention.
Figure 2:
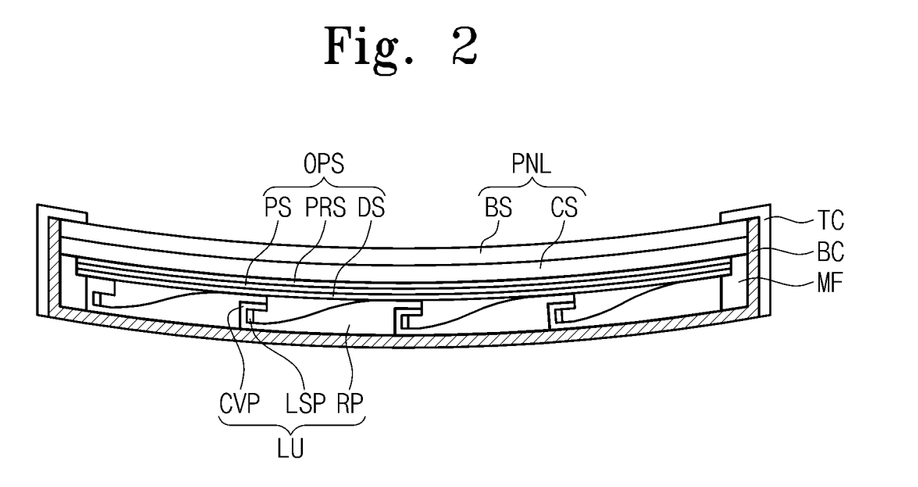
FIG. 2 is a cross-sectional view taken along line I-I' of FIG. 1.

FIG. 1 is an exploded perspective view showing an exemplary embodiment of a display apparatus according to the invention and FIG. 2 is a cross-sectional view taken along line IT of FIG. 1.

Referring to FIGS. 1 and 2, the display apparatus includes a display panel PNL, a backlight unit BLU and a top chassis TC. For the convenience of explanation, a direction in which an image is displayed in the display device will be described as an upper direction and a direction opposite to the upper direction will be described as a lower direction, but are not limited thereto or thereby.

The display panel PNL displays the image. The display panel PNL is a light receiving (non-self-emitting) display panel. Accordingly, the display panel PNL may be, but not limited to, a liquid crystal display panel, an electrowetting display panel, an electrophoretic display panel, a microelectromechanical system ("MEMS") display panel or an embedded microcavity display ("EMD") panel.

The liquid crystal display panel includes two substrates facing each other, and a liquid crystal layer disposed between the two substrates and including liquid crystal molecules. At least one of the two substrates includes electrodes which form an electric field in the liquid crystal layer, thereby controlling an arrangement of the liquid crystal molecules. The liquid crystal molecules are driven by the electric field so as to transmit or block light, to thereby display a desired image on the liquid crystal display panel.

The electrowetting display panel includes two substrates facing each other, and an electrowetting layer disposed between the two substrates. The electrowetting layer includes two fluids immiscible with each other. One of the two fluids has polarity or conductivity and the other one of the two fluids has non-polarity or non-conductivity. At least one of the two substrates includes electrodes which control the fluid with the polarity or conductivity. The electrowetting layer transmits or blocks the light by deforming the shape of the fluids using electric charges on the surface of the conductive fluid, thereby displaying the desired image on the electrowetting display panel.

The electrophoretic display panel includes two substrates facing each other, and an electrophoretic layer disposed between the two substrates. The electrophoretic layer includes an insulating medium and charged particles. At least one of the two substrates includes electrodes to control the charged particles. The charged particles move to a predetermined direction by an electric field generated on the electrodes, so that the electrophoretic layer transmits or blocks the light. Thus, a desired image is displayed on the electrophoretic display panel.

The MEMS display panel includes a substrate, and a micro-shutter disposed on the substrate. The micro-shutter is provided with flexible electrodes connected thereto. The micro-shutter moves by electrostatic force between the flexible electrodes to transmit or block the light, and thus the desired image is displayed on the MEMS display panel.

The EMD panel includes a substrate, a microcavity on the substrate, and an image display layer, e.g., a liquid crystal layer, disposed in the microcavity. The substrate includes electrodes to provide an electric field to the image display layer in the microcavity. Due to the electric field generated by the electrodes, the image display layer is driven so as to transmit or block the light. Accordingly, the desired image is displayed on the EMD panel.

In the illustrated exemplary embodiment, the liquid crystal display panel will be described as the display panel PNL.

The display panel PNL has a rectangular plate shape in a plan view with two pairs of sides meeting at right angles, and one of the two pairs of sides is longer than the other. In the illustrated exemplary embodiment, the display panel PNL has the rectangular plate shape of a pair of long sides and a pair of short sides. A direction in which the long sides are elongated will be referred to as a first direction D1 and a direction in which the short sides are elongated will be referred to as a second direction D2.

The display panel PNL has flexibility. That is, the display panel PNL is manufactured at first to have an initial flat or curved shape, but the display panel PNL may be provided in various shapes different from the initial shape after being manufactured. The display panel PNL may be bent in various ways. In one exemplary embodiment, for instance, when assuming that the direction in which the image is displayed in the display panel PNL is the upper direction and the direction opposite to the upper direction is the lower direction, the display panel PNL is bent so to be convex toward the upper or lower direction. However, the direction to which the display panel PNL is bent should not be limited thereto or thereby. In one exemplary embodiment, for instance, a center portion of the display panel PNL may be convex toward the upper direction, e.g., toward a user such as a viewer. In addition, a portion of the display panel PNL is convex toward the upper direction and the other portion of the display panel PNL is convex toward the lower direction.

In addition, the display panel PNL is manufactured to have the initial curved shape, but has rigidity to maintain that curved shaped within a curved display apparatus.

In the illustrated exemplary embodiment, the display panel PNL is bent at a first curvature to be convex toward the lower direction. That is, the display panel PNL includes an upper surface and a lower surface, and the upper and lower surfaces are each a curved surface having the first curvature. Hereinafter, the lower surface of the display panel PNL is referred to as a first curved surface.

A distance between the user and an end portion of the display panel PNL may be equal to a distance between the user and a center portion of the display panel PNL when the user is positioned at a specific location, and thus the image may be perceived by the user without distortion.

The display panel PNL includes a base substrate BS, an opposite substrate CS facing the base substrate BS, and a liquid crystal layer (not shown) including liquid crystal molecules and disposed between the base substrate BS and the opposite substrate CS. The end portion of the display panel PNL is covered by a top chassis TC. According to the illustrated exemplary embodiment, the base substrate BS includes one or more pixel electrode (not shown), and one or more thin film transistor (not shown) electrically connected to the pixel electrode, such as in a one-to-one correspondence. Each of a plurality of thin film transistors switches a driving signal applied to a corresponding pixel electrode of a plurality of pixel electrodes. In addition, the opposite substrate CS includes a common electrode (not shown) that forms an electric field in cooperation with the pixel electrodes to control the arrangement of the liquid crystal molecules of the liquid crystal layer. The display panel PNL drives the liquid crystal molecules to display the image in the upper direction, such as at a front or viewing side of the display apparatus.

The backlight unit BLU is disposed under the display panel PNL to supply light to the display panel PNL. The backlight unit BLU includes a mold frame MF which supports the display panel PNL, one or more light source unit LU which generates and supplies the light to the display panel PNL, optical sheets OPS which improve light efficiency, and a bottom chassis BC which accommodates the display panel PNL, the mold frame MF, the light source unit LU and the optical sheets OPS therein.

The mold frame MF is provided along the end portion of the display panel PNL and is disposed under the display panel PNL to support the display panel PNL thereon. The mold frame MF may include a fixing member, e.g., a catching jaw, to fix or hold the optical sheets OPS and/or the light source unit LU. The mold frame MF is provided in positions corresponding to four sides of the display panel PNL or a portion of the four sides of the display panel PNL. In one exemplary embodiment, for instance, the mold frame MF has a rectangular ring shape in the plan view corresponding to the four sides of the display panel PNL or a rotated U-shape in the plan view corresponding to three sides of the display panel PNL. The mold frame MF may be integral to form a single unitary and indivisible unit, or may be a collection of plural pieces which are assembled with each other to form the ring shape or U-shape. The mold frame MF includes an organic material such as a polymer resin, but should not be limited thereto or thereby, as long as the mold frame MF has the same shape and function described above.

A plurality of light source units LU is arranged along the first curved surface of the display panel PNL. In FIG. 1, four light source units LU are arranged in the first direction D1 along the long sides of the display panel PNL, but should not be limited thereto or thereby. That is, the light source units LU may be arranged in the second direction D2 along the short side of the display panel PNL, and the number of the light source units LU should not be limited to four. In addition, the light source LU units may be arranged in both the first and second directions D1 and D2 along both the long and short sides of the display panel PNL, e.g., in a matrix form. The size and arrangement of the light source units LU depend on the size and first curvature of the display panel PNL.

Each light source unit LU includes a light source part LSP, a reflective part RP and a cover part CVP. The light source part LSP is disposed at a side of the reflective part RP and provides the light to the reflective part RP. The reflective part RP is disposed adjacent to the light source part LSP and/or mounted on the surface of the light source part LSP. The reflective part RP includes a reflective surface RS which reflects the light provided from the light source part LSP, to the display panel PNL. The cover part CVP is connected to the reflective part RP to surround at least a portion of the light source part LSP. The cover part CVP and the reflective part RP may be integral so as to form a single and indivisible unit, but should not be limited thereto or thereby.

The optical sheets OPS are disposed between the light source unit LU and the display panel PNL.

The optical sheets OPS have flexibility just as the display panel PNL has flexibility. That is, the optical sheets OPS are manufactured at have an initial flat or curved shape, but the optical sheets OPS may be provided in various shapes different from the initial shape after being manufactured. In addition, the optical sheets OPS are manufactured to initially have the curved shape, but has rigidity to maintain that curved shaped within the curved display apparatus.

In the illustrated exemplary embodiment, the optical sheets OPS are disposed corresponding to the first curved surface of the display panel PNL, and have the first curvature similar to the display panel PNL.

The optical sheets OPS controls the light exiting from the light source part LSP. The optical sheets OPS may include a diffusion sheet DS, a prism sheet PS and a protective sheet PRS, which are sequentially stacked on the light source units LU, but are not limited thereto or thereby.

The diffusion sheet DS diffuses the light exiting from the light source units LU. The prism sheet PS condenses the light diffused by the diffusion sheet DS and allows the light to travel in a direction substantially vertical to the display panel PNL. The light exiting from the prism sheet PS is vertically incident into the display panel PNL. The protective sheet PRS is disposed on the prism sheet PS to protect the prism sheet PS from external impacts. In the illustrated exemplary embodiment, the optical sheets OPS include one diffusion sheet DS, one prism sheet PS and one protective sheet PRS, but should not be limited thereto or thereby. That is, one or more of the diffusion sheet DS, the prism sheet PS and the protective sheet PRS of the optical sheets OPS may be provided in plural number, or one or more of the diffusion sheet DS, the prism sheet PS and the protective sheet PRS may be omitted from the optical sheets OPS.

The bottom chassis BC accommodates a portion of the backlight unit BLU therein.

The bottom chassis BC includes a bottom portion substantially parallel to the lower surface of the display panel PNL, and a sidewall portions extended in the upper direction from the bottom portion. The portion of the backlight unit BLU is accommodated in a space defined by the bottom portion and the sidewall portion. The bottom portion may be curved to have a predetermined curvature in accordance with the shape of the lower surface of the light source units LU.

The top chassis TC is disposed on the display panel PNL. The top chassis TC supports a front end portion of the display panel PNL, and covers a side surface of the mold frame MF and/or the bottom chassis BC. A display window WD is defined in the top chassis TC and exposes a display area of the display panel PNL.

In the illustrated exemplary embodiment, the display panel PNL, the optical sheets OPS and the bottom chassis BC have the uniform curvature. That is, the optical sheets OPS are curved to have the first curvature similar to the display panel PNL, and the light source units LU are arranged to allow the lower surface thereof to also have the first curvature. In addition, the mold frame MF and the top chassis TC may be curved to have the curvature corresponding to that of the display panel PNL.

Hereinafter, the light source units LU will be described in detail with reference to FIG. 3.

Figure 3A:
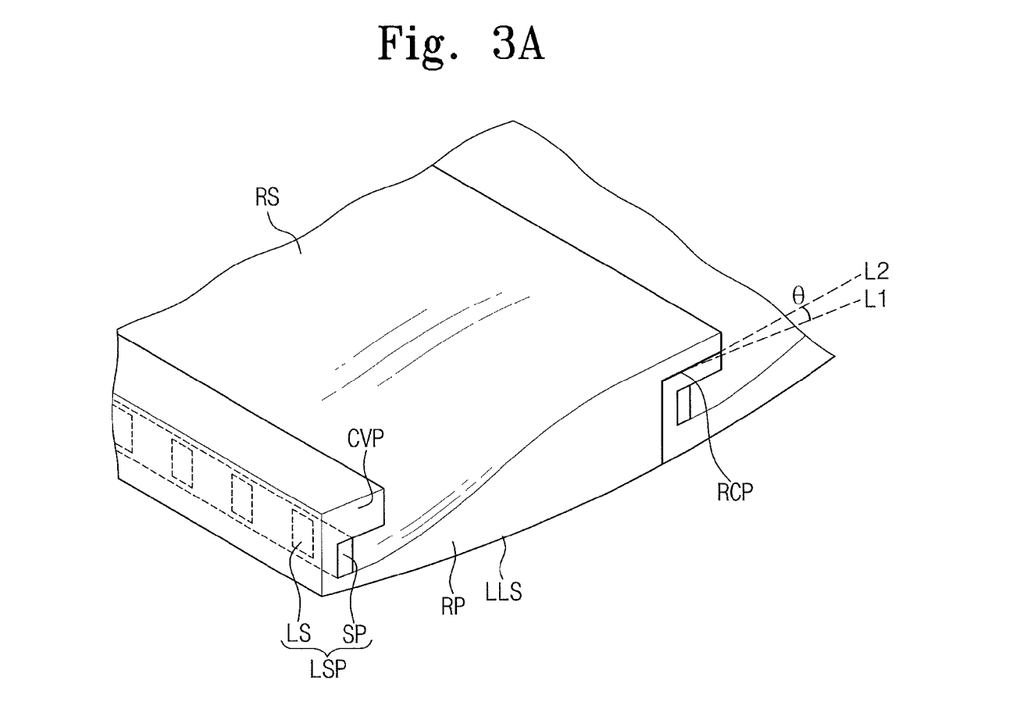
FIG. 3A is a perspective view showing a portion of an exemplary embodiment of a light source unit according to the invention.
Figure 3B:
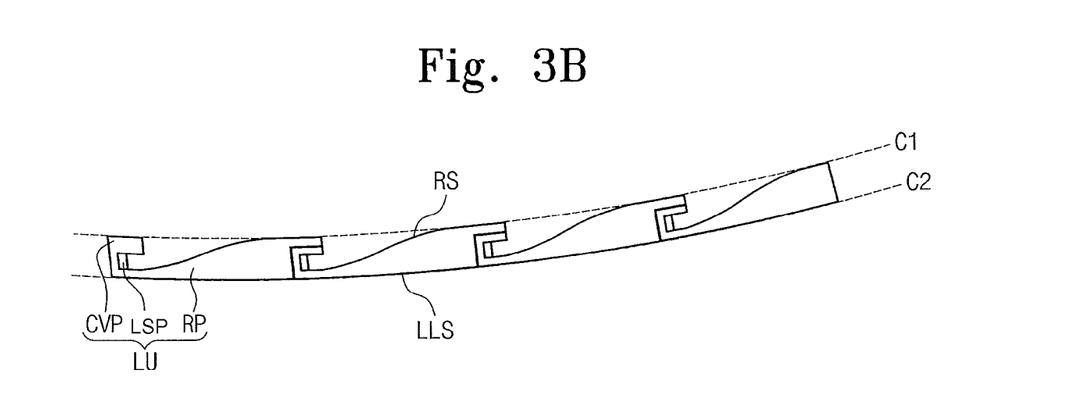
FIG. 3B is a cross-sectional view showing an exemplary embodiment of an arrangement of a plurality of light source units shown in FIG. 3A.

FIG. 3A is a perspective view showing a portion of an exemplary embodiment of a light source unit according to the invention and FIG. 3B is a cross-sectional view showing an exemplary embodiment of an arrangement of a plurality of light source units in FIG. 3A.

Referring to FIGS. 3A and 3B, each light source unit LU includes the light source part LSP, the reflective part RP and the cover part CVP.

The light source part LSP is disposed at the side of the reflective part RP, and generates and provides the light to the reflective part RP.

The light source part LSP includes one or more light source LS, and a supporter SP supporting the light sources LS. The supporter SP may be a printed circuit board including wirings that apply a source voltage to the light sources LS, and may have a rectangular plate shape elongated in the second direction D2 as shown in FIGS. 3A and 3B. The light source LS may be a point light source, a line light source or a surface light source, but is not limited thereto or thereby. In the illustrated exemplary embodiment, the point light source, e.g., a light emitting diode, is used as the light source LS. The light emitting diode is provided in a plural number and the light emitting diodes are arranged in the second direction D2. Herein, the term "light source" means the minimum unit which is connected to a same power source line and turned on and off so as to individually control the amount of the light emitted therefrom. Accordingly, one light source LS may be considered as a single light emitting diode, or collectively refer to plural light emitting diodes of which a brightness is substantially simultaneously controlled.

In the illustrated exemplary embodiment, the light source part LSP includes the supporter SP and the plurality of light sources LS, but should not be limited thereto or thereby. In an alternative exemplary embodiment, the supporter SP may be omitted, and a separate supporting member supporting each of the light sources LS and/or a wiring applying the source voltage to the light sources LS may be prepared.

Since each light source LS is individually turned on and off when the light source part LSP includes the plurality light sources LS, the amount of the light exiting from areas respectively corresponding to the light sources LS is individually controlled in accordance with the drive of each light source LS. That is, a two-dimensional local dimming is available.

The reflective part RP includes an upper surface facing the display panel PNL, and a lower surface LLS opposite to the upper surface and facing the bottom chassis BC. The upper surface serves as the reflective surface RS to reflect the light provided from the light source part LSP to the display panel PNL disposed thereabove.

The reflective surface RS is a curved surface, and in a cross-sectional view of the reflective part RP, the reflective surface RS may be a second curved surface having a second curvature different from the first curvature of the display panel PNL. The curve of the reflective surface RS, in the cross-sectional view of the reflective part RP, may be a portion of different curvature radiuses from each other or a portion of different curvature circles from each other. In one exemplary embodiment, for instance, the second curvature of the reflective surface RS may have one or more inflection points. Here, since the light source units LU are arranged along the first curvature of the display panel PNL, at least a portion of the reflective surface RS of each light source unit LU is tangent to a curved surface of the optical sheets OPS, where the curved surface of the optical sheets OPS is parallel to the first curved surface of the display panel PNL.

The lower surface LLS of the reflective part RP is a flat or curved surface. When the lower surface LLS is the curved surface, the lower surface LLS has substantially the same curvature as the curvature of the display panel PNL, e.g., the first curvature. Accordingly, when the light source units LU are arranged, a portion of the reflective surface RS of each light source units LU is respectively tangent to a first imaginary surface C1 substantially parallel to the first curved surface of the display panel PNL. Here, the lower surface LLS of each light source unit LU is arranged on a second imaginary surface C2 substantially parallel to the first curved surface of the display panel PNL. The lower surfaces LLS may form essentially form a continuous lower surface of the plurality of light source units LU, since a lower surface LLS at a first end of the reflective part RP of a first light source unit LU meets a lower surface LLS at a second end of the reflective part of a second light source unit LU adjacent to the first light source unit LU, but the invention is not limited thereto or thereby. In the illustrated exemplary embodiment, since a curvature formed by arranging the lower surfaces LLS is the same as the first curvature of the display panel PNL, a non-uniform gap between the light source units LU and the display panel PNL, between the light source units LU and the optical sheets OPS, and between the light source units LU and the bottom chassis BC, is reduced or effectively prevented.

The cover part CVP is disposed at a first side of the reflective part RP and surrounds the light source part LSP. A side portion of the cover part CVP is opened. The cover part CVP reflects the light exiting from the light source part LSP, which is not directed to the reflective surface RS, so as to allow the light to travel toward the reflective surface RS. In particular, the cover part CVP is connected to the reflective part RP and a portion thereof is disposed between the light source part LSP and the display panel PNL. When viewed in the plan view, the cover part CVP completely covers the light source part LSP, and thus the user does not perceive the light source part LSP from the upper direction while the amount of the light reflected by the reflective surface RS is enhanced. Consequently, a light leakage phenomenon is reduced or effectively prevented.

In the illustrated exemplary embodiment, the cover part CVP has a flat or rectilinear shape in an area corresponding to a rear surface of the light source part LSP, but should not be limited thereto or thereby, so as long as the cover part CVP covers the light source part LSP and reflects the light from the light source part LSP to the reflective surface RS. In one exemplary embodiment, for instance, a cross-section of the cover part CVP, which corresponds to the rear surface of the light source part LSP, may have a semi-circular shape, a quarter-circular shape or a polygonal shape which surrounds the light source part LSP. Where the cover part CVP has the semi-circular shape to surround the light source part LSP, a connection angle between two light source units LU adjacent to each other may be easily adjusted.

A second side of the reflective part RP opposite to the first side is provided with a recessed portion RCP to which an adjacent light source unit LU is coupled. The recessed portion RCP has a shape corresponding to the shape of the cover part CVP of the adjacent light source unit LU. An outer surface of the adjacent cover part CVP faces and may contact the inner surface of the recessed portion RCP.

Although not shown in figures, a coupling member may be disposed in the recessed portion RCP to stably couple and fix adjacent light source units LU to each other. In an exemplary embodiment, the coupling member may be an adhesive member which adheres the adjacent light source units LU to each other, or may be a coupling recess and protrusion which are coupled to each other. Where the coupling recess and protrusion are adopted as the coupling member, the coupling protrusion is disposed at an inner side of the reflective part RP of a first light source unit LU and downwardly extended toward the lower direction, and the coupling recess into which the coupling protrusion is inserted is disposed on the upper surface of the cover part CVP of a second light source unit LU adjacent to the first light source unit LU.

In the illustrated exemplary embodiment, the light source units LU are arranged along the first curved surface, and an angle between the upper surfaces of the cover parts CVP of adjacent light source units LU to each other is greater than zero (0). That is, when a line substantially parallel to the upper surface of the cover part CVP of a second light source unit LU is a first line L1, and a line substantially parallel to the upper surface of the cover part CVP of a first light source unit LU adjacent to the second light source unit LU is a second line L2, the angle θ between the first line L1 and the second line L2 is in a range from about zero degree to about 90 degrees. Therefore, when the angle between the upper surfaces of the cover parts CVP of light source units LU adjacent to each other is controlled, the curvature formed by the light source units LU may be adjusted. Since the shape of the recessed portion RCP corresponds to the cover part CVP, an angle formed by the surface of the recessed portion RCP may be changed by the curvature of the light source units LU.

The cover part CVP may include a material having high reflectivity. In detail, the cover part CVP may include a metal material having high reflectivity, such as aluminum, silver, gold, titanium, an oxide thereof or an alloy thereof.

In addition, the cover part CVP may include a flexible material having elasticity. Where the flexible material has low reflectivity, a reflective coating film and/or a reflective coating layer may be provided on the flexible material of the cover part CVP so as to obtain high reflectivity. The reflective coating film may be disposed on an inner surface of the upper part of the cover part CVP and the reflective coating layer may be disposed on an inner surface of the upper surface of the cover part CVP.

The cover part CVP may be a single, unitary and indivisible unit. In one exemplary embodiment of forming the reflective part RP and/or the cover part CVP, the cover part CVP is formed by an extrusion or injection molding method.

In the illustrated exemplary embodiment, the plurality of light source units LU has the same size and shape. Among the plurality of light source units LU illustrated in FIG. 3B, for example, a leftmost light source unit LU may include the cover part CVP having a relatively large cross-sectional thickness since there is no recessed portion RCP of an adjacent light source unit LU further to the left to overlap. Similarly, a rightmost light source unit LU may not include the recessed portion RCP since there is no cover part CVP of an adjacent light source unit LU further to the right to overlap.

Although not shown in figures, a fixing part may be further disposed between the bottom chassis BC and the light source units LU to support the light source units LU, such that movement of the light source units LU in the bottom chassis BC is reduced or effectively prevented. The fixing part may be configured to include a coupling recess and a coupling protrusion. The coupling recess may be in one of the bottom chassis BC and the light source units LU, and the coupling protrusion is in the other one of the bottom chassis BC and the light source units LU.

In the display apparatus having a backlight unit with the above-mentioned structure, since the display apparatus does not include a light guide plate, the light from the light source part is uniformly supplied to the display panel. In a conventional backlight unit, a light guide plate is disposed adjacent to a light source, and the light guide plate is undesirably deformed, e.g., expansion, bending, etc., due to heat generated by the light source, humidity from exterior or gravity. As a result, a distance between the light source and the light guide plate, and between the light guide plate and an optical sheet of the conventional backlight unit becomes irregular, such that light is non-uniformly supplied to the display panel thereby causing deterioration in display quality of the display apparatus. In addition, the light guide plate and the optical sheet of the conventional backlight unit have flexibility, such that maintaining a curvature of the light guide plate and the optical sheet equal to a curvature of the display panel is difficult.

In contrast, since the illustrated exemplary embodiment of the backlight unit does not include a light guide plate, defects caused by the deformation of the light guide plate do not occur. In addition, in the exemplary embodiment of the invention, the optical sheet may have the same curvature as that of the display panel by only using a plurality of light source units, regardless of the flexibility of the optical sheet, to maintain a regular distance between the optical sheet and the light source units. Thus, the optical sheet and the light source units are uniformly arranged along the curvature of the display panel and the light is uniformly supplied to the display panel, thereby improving the image display quality of the display apparatus. Further, in a method of manufacturing the backlight unit, the light source units may be easily formed by an extrusion or injection molding method and have a relatively small thickness, thereby reducing an overall thickness of the backlight unit and achieve a slim display apparatus which includes the backlight unit.

Figure 4A:
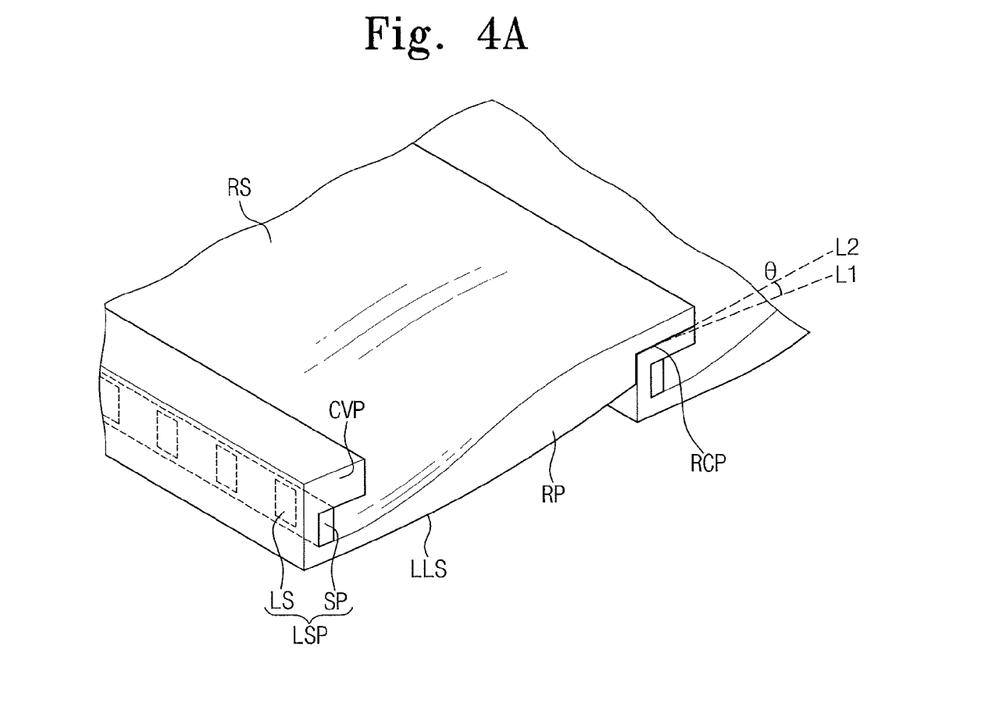
FIG. 4A is a cross-sectional view showing another exemplary embodiment of a light source unit according to the invention.
Figure 4B:
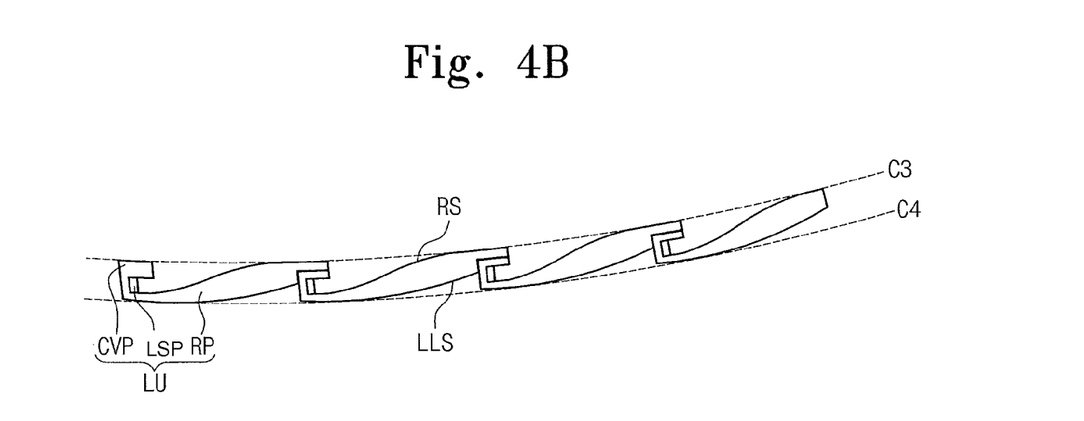
FIG. 4B is a cross-sectional view showing an exemplary embodiment of an arrangement of a plurality of light source units shown in FIG. 4A.

FIG. 4A is a cross-sectional view showing another exemplary embodiment of a light source unit according to the invention and FIG. 4B is a cross-sectional view showing an exemplary embodiment of an arrangement of a plurality of light source units in FIG. 4A. In FIGS. 4A and 4B, the same reference numerals denote the same elements in FIGS. 2, 3A, and 3B, and thus detailed descriptions of the same elements will be omitted in order to avoid redundancy.

Referring to FIGS. 4A and 4B, each light source unit LU includes the light source part LSP, the reflective part RP and the cover part CVP.

The light source part LSP is disposed at the side of the reflective part RP, and generates and supplies the light to the reflective part RP.

The reflective part RP includes an upper surface facing the display panel PNL, and a lower surface LSS opposite to the upper surface and facing the bottom chassis BC. The upper surface serves as the reflective surface RS to reflect the light provided from the light source part LSP to the display panel PNL disposed thereabove.

The reflective surface RS is a curved surface, and in a cross-sectional view of the reflective part RP, the reflective surface RS may be a second curved surface having a second curvature different from the first curvature of the display panel PNL. The curve of the reflective surface RS in the cross-sectional view of the reflective part RP, may be a portion of different curvature radiuses from each other or a portion of different curvature circles from each other. In one exemplary embodiment, for instance, the curve of the reflective surface RS may have one or more inflection points.

The reflective surface RS may include a plurality of curvature surfaces each of which have different curvatures from each other, e.g., the reflective surface RS includes a second curve surface and a third curve surface which are subsequently located from the light source units LU. In this case, the second curve surface may have a recessed shape in a downward direction and the third curve surface may have a protruding shape in a upward direction. In addition, the reflective surface RS may be provided with planes, which have no curvatures and are located at two ends of the reflective surface RS.

Here, since the light source units LU are arranged along the first curvature of the display panel PNL, at least a portion of the reflective surface RS of each light source unit LU is tangent to a curved surface of the optical sheets OPS, where the curved surface of the optical sheets OPS is parallel to the first curved surface of the display panel PNL.

The lower surface LLS of the reflective part RP is formed a curved surface with a third curvature. The third curvature may be different from the first curvature of the display panel PNL, such as greater than the first curvature. In addition, the third curvature is different from the second curvature or substantially equal to the second curvature in a portion or all areas of the reflective part RP.

When the lower surface LLS has the third curvature greater than the first curvature of the display panel PNL, the light source units LU are arranged to correspond to the first curvature of the display panel PNL even though the first curvature of the display panel PNL is changed. In the illustrated exemplary embodiment, when the light source units LU are arranged along the first curvature, a portion of the reflective surface RS of each light source unit LU makes contact with a third imaginary line C3 substantially parallel to the first curved surface of the display panel PNL. Here, the lower surface LLS of each light source unit LU makes contact with a fourth imaginary line C4 different from the third imaginary line C3 and substantially parallel to the first curved surface. The third and fourth imaginary lines C3 and C4 may be variously changed to have different curvatures from those of the first and second imaginary lines C1 and C2 shown in FIG. 3B.

In the illustrated exemplary embodiment, the curvature of the lower surface LLS of the light source units LU may be controlled to be applied only to the display panel PNL having a specific curvature, but in alternative exemplary embodiments, the curvature of the lower surface LLS of the light source units LU may be controlled to be applied to the display panel PNL having various curvatures. Since the lower surface LLS of the light source units LU has the third curvature greater than the first curvature of the display panel PNL, only a portion of the lower surface LLS makes contact with the bottom chassis BC and a contact point between the lower surface LLS and the fourth imaginary line C4 may be varied according to the third curvature. In contrast, a substantially large portion of the lower surface LLS, such as close to an entire portion, makes contact with the bottom chassis BC in FIGS. 2 to 3B. As described above, the exemplary embodiment of the light source units LU may be applied to not only the display panel PNL having the first curvature but also the display panel PNL having a curvature different from the first curvature, and may form various curvatures regardless of the size of the display panel PNL and/or the degree of bending of the display panel PNL.

In the display apparatus having a backlight unit with the above-mentioned structure, the optical sheets and the light source units are uniformly arranged with respect to each other along the curvature of the curved display panel, and the light is uniformly supplied to a display panel of the display apparatus, to thereby improve the image display quality of the display apparatus.

Figure 5A:
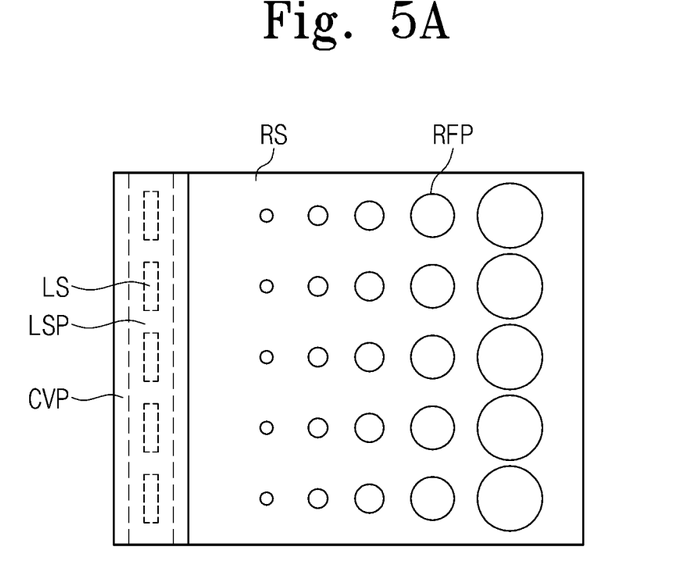
FIGS. 5A and 5B are plan views showing exemplary embodiments of a reflective pattern on a reflective part according to the invention.
Figure 5B:
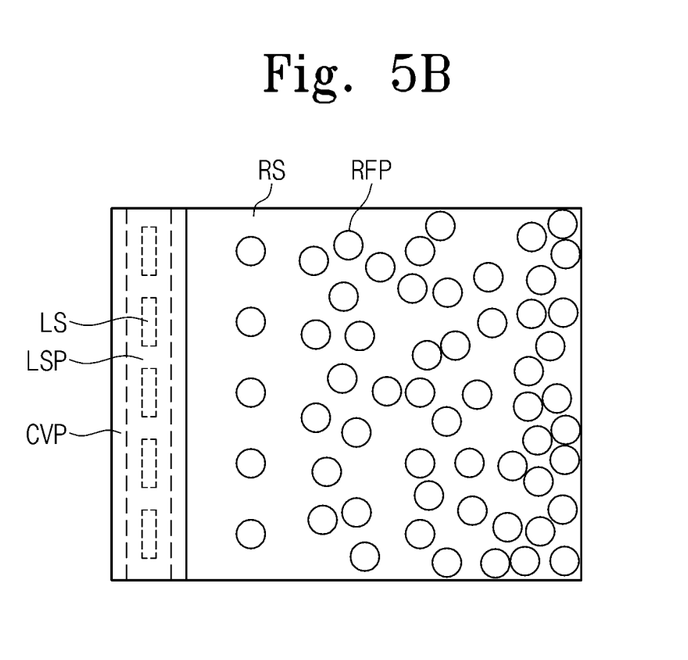

FIGS. 5A and 5B are plan views showing exemplary embodiments of a reflective pattern RFP disposed on a reflective part according to the disclosure.

Referring to FIGS. 5A and 5B, the reflective pattern RFP is disposed on the reflective part RP. The reflective pattern RFP is protruded or recessed from the upper surface (e.g., the reflective surface RS) of the reflective part RP. In addition, the reflective pattern RFP may be a discrete fine pattern having a relative small dimension such as a pattern printed on the reflective part RP.

In an exemplary embodiment of a method of forming a backlight unit, the reflective pattern RFP may be formed by a printing method or a laser ablation method.

In the illustrated exemplary embodiment, the reflective pattern RFP is protruded from the reflective surface RS and has a hemispherical shape, but the shape of the reflective pattern RFP should not be limited to the hemispherical shape. That is, the reflective pattern RFP may have various shapes which protrude from the reflective surface RS, e.g., a pyramid shape, a polygonal column shape, a prism shape, etc., and thus the reflective pattern RFP has various shapes, such as a rectangular shape, a triangular shape, etc., in a cross-section thereof. In the plan view of the reflective surface RS, the reflective pattern RFP may be arranged in a linear pattern such as including rows and columns, in a zigzag or alternating pattern or randomly.

In addition, a planar width, a cross-sectional height and an arrangement density of the reflective pattern RFP in each light source unit LU may be variously controlled in order to enhance brightness uniformity of the light reflected to the display panel PNL.

In general, since the brightness is lowered as a distance increases from the light source part LSP, increasing the width, height and/or density of the reflective pattern RFP in a unit area of the reflective surface RS enhances the brightness in an area further from the light source part LSP. FIG. 5A shows increased sizes and planar areas of the reflective pattern RFP as the reflective pattern RFP is positioned further away from the light source part LSP, and FIG. 5B shows increased arrangement density of the reflective pattern RFP as the reflective pattern RFP is positioned further away from the light source part LSP.

FIGS. 5A and 5B show the increase of the size and density of the reflective pattern RFP as the reflective pattern RFP is positioned further away from the light source part LSP, but the reflective pattern RFP should not be limited thereto or thereby. That is, sizes and arrangement of the reflective pattern RFP may be different according to the curvature or shape of the reflective part RP. In one exemplary embodiment, for instance, the size and density of the reflective pattern RFP may be decreased as the reflective pattern RFP is positioned further away from the light source part LSP, or may be decreased after being previously increased. In other words, the reflective pattern RFP may be set in various ways depending on the shape and arrangement of the light source part LSP and the light source unit LU.

Figure 6A:
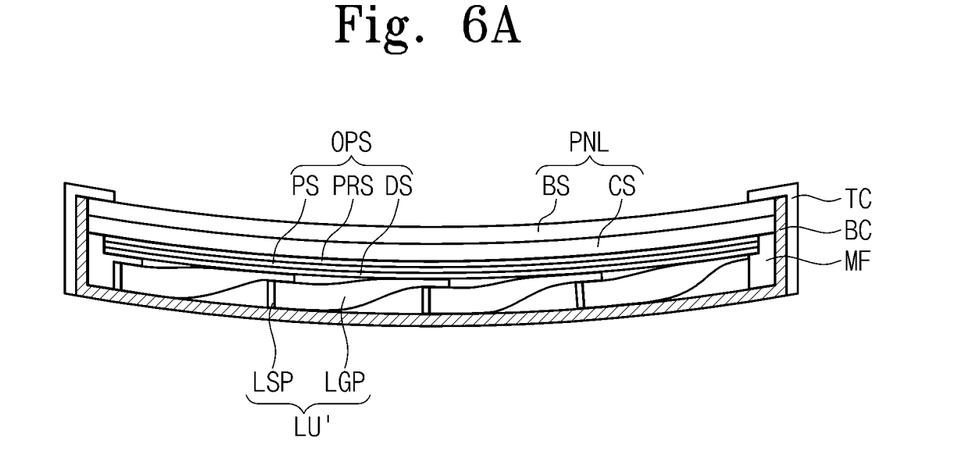
FIG. 6A is a cross-sectional view showing another exemplary embodiment of a display apparatus according to the invention.
Figure 6B:
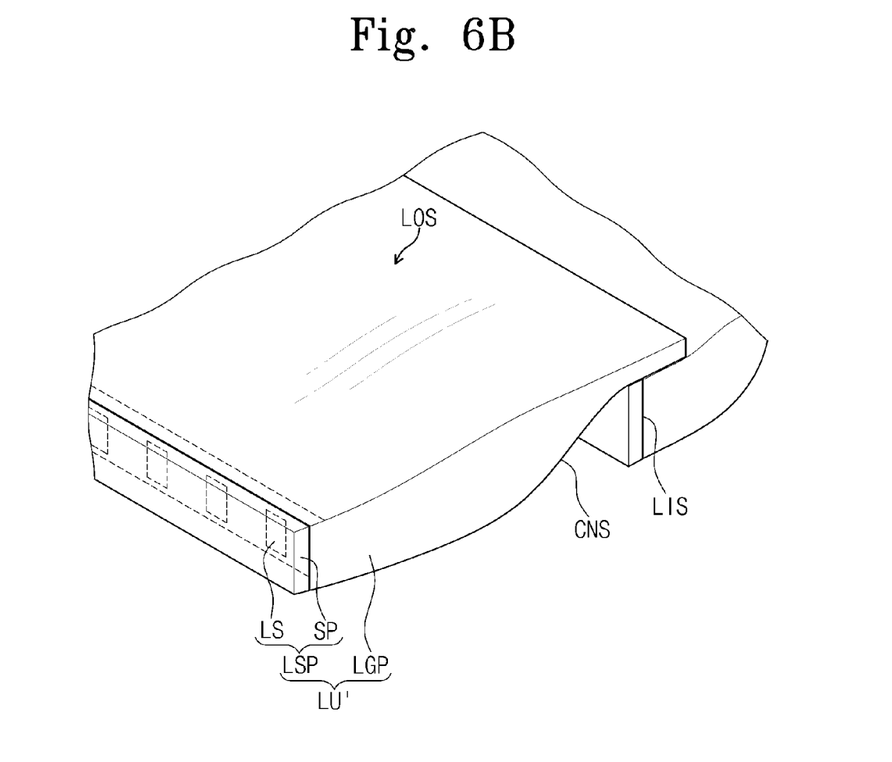
Figure 6C:
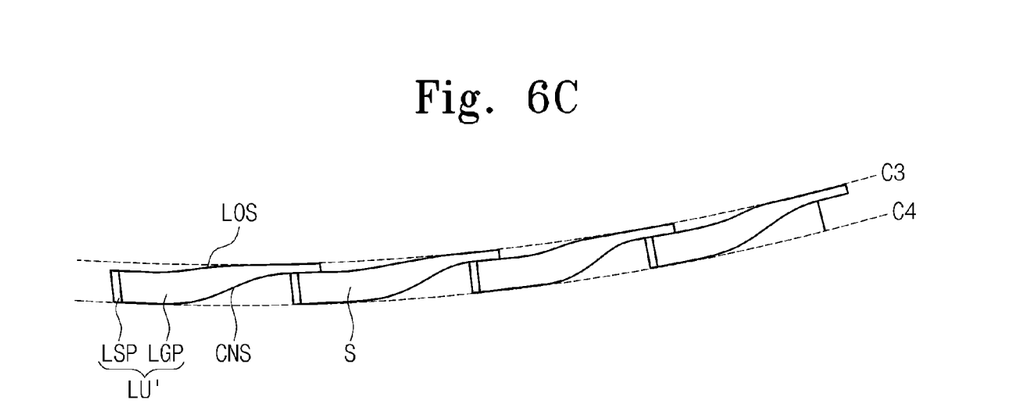
FIG. 6C is a cross-sectional view showing an exemplary embodiment of an arrangement of a plurality of light sources shown in FIG. 6A.

FIG. 6A is a cross-sectional view showing another exemplary embodiment of a display apparatus according to the disclosure, FIG. 6B is a perspective view showing the light source shown in FIG. 6A, and FIG. 6C is a cross-sectional view showing an exemplary embodiment of an arrangement of light sources in FIG. 6A. In FIGS. 6A to 6C, the same reference numerals denote the same elements in FIGS. 3A and 3B, and thus detailed descriptions of the same elements will be omitted in order to avoid redundancy.

Referring to FIG. 6A, the display apparatus includes the display panel PNL, the backlight unit BLU and the top chassis TC.

The display panel PNL is curved downward to have a first curvature in the cross-section thereof after being manufactured.

The backlight unit BLU includes a mold frame MF supporting the display panel PNL, a plurality of light source units LU' supplying light to the display panel PNL, optical sheets OPS enhancing light efficiency of the light exiting from the light source units LU', and a bottom chassis BC accommodating the display panel PNL, the mold frame MF, the light source units LU' and the optical sheets OPS therein.

The mold frame MF is provided along the end portion of the display panel PNL and disposed under the display panel PNL to support the display panel PNL. The mold frame MF may include a fixing member, e.g., a catching jaw, to fix or hold the optical sheets OPS and/or the light source units LU'.

Each of the light source units LU' includes a light source part LSP and a light guide part LGP. The light source part LSP is disposed at a side of the light guide part LGP to supply the light to the light guide part LGP. The light source part LSP includes a plurality of light sources LS and a supporter SP that supports the light sources LS. The light guide part LGP guides light from the light source part LSP and directs the guided light toward the display panel PNL. A collection of light guide parts LGP may be referred to as a light guide member.

The light guide part LGP is disposed adjacent to the light source part LSP, and includes a light incident surface LIS into which the light emitted from the light source part LSP is incident and a light exiting surface LOS from which the light incident through the light incident surface LIS exits. The light exiting surface LOS faces a rear surface of the display panel PNL and the light exiting through the light exiting surface LOS is provided to the display panel PNL.

The light guide part LGP of a first light source unit LU' is partially overlapped with light guide part LGP of an adjacent second light source unit LU', when viewed in a plan view. The overlapping of the light guide part LGP of the first light source unit LU' with an adjacent light guide part LGP reduces or effectively prevents the light emitted from the light source part LSP from being directly supplied to the display panel PNL. To this end, an end portion of the adjacent light guide part LGP is disposed between the light source part LSP of the first light source unit LU' and the display panel PNL.

In addition, the light guide plate LGP includes an opposite surface CNS opposite to the light exiting surface LOS, and the light incident through the light incident surface LIS is reflected by the opposite surface CNS to travel toward the light exiting surface LOS. In order to improve reflectivity of the opposite surface CNS with respect to the incident light, a separate reflective member, e.g., a reflective sheet, may be attached to the opposite surface CNS, but the invention is not limited thereto or thereby.

The light exiting surface LOS is a flat or curved surface, and in a cross-sectional view of the light guide part LGP, the light exiting surface LOS may be a curved surface having a curvature different from the first curvature of the display panel PNL. The curve of the light exiting surface LOS in the cross-sectional view of the light guide part LGP may be a portion of different curvature radiuses from each other or a portion of different curvature circles from each other. In one exemplary embodiment, for instance, the light exiting surface LOS may be a curve which has one or more inflection points. Here, since each of the light source units LU' is sequentially arranged along the first curvature of the display panel PNL, at least a portion of the light exiting surface LOS of each light source unit LU' is tangent to a curved surface of the optical sheets OPS, where the curved surface of the optical sheets OPS is parallel to the first curved surface of the display panel PNL.

The opposite surface CNS is a flat surface, a curved surface or a sum of the flat and curved surfaces. When the opposite surface CNS is the curved surface, the opposite surface CNS has a curvature greater than the first curvature of the display panel PNL. Accordingly, when the light source units LU' are arranged along the first curvature, a portion of the opposite surface CNS of each light source unit LU' makes contact with an imaginary line C4 which is substantially parallel to the first curved surface (e.g., the lower surface of the display panel PNL). The reflective surface RS of each light source unit LU' makes contact with the third imaginary line C3 which is substantially parallel to the first curved surface of the display panel PNL. In the illustrated exemplary embodiment, since the curvature of the opposite surface CNS is greater than the first curvature of the display panel PNL, the light source units LU' may be stably arranged under the display panel PNL along the first curvature of the display panel PNL.

In the illustrated exemplary embodiment, the optical sheets OPS are arranged in the same curvature as that of the display panel by only using the light source units LU' regardless of the flexibility of the light guide part LGP and the optical sheets OPS. Thus, movement or deformation of the light guide part LGP and the optical sheets OPS may be reduced or effectively prevented by the arrangement of the light source units LU'. Therefore, the light source units LU' are uniformly arranged along the first curvature of the display panel, and the light is uniformly supplied to the display panel, thereby improving the image display quality of the display apparatus.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
   a curved display panel having a first curvature; and
   a plurality of light source units arranged along the first curvature of the display panel, each light source unit comprising:
      a reflective part comprising a reflective upper surface which faces the display panel and has a second curvature different from the first curvature of the display panel; and
      a light source part which is at a first side of the reflective part, which generates and provides a light to the reflective surface.

2. The display apparatus of claim 1, wherein a portion of the curved reflective surface is tangent to a curve substantially parallel to the first curvature.

3. The display apparatus of claim 1, wherein the each light source unit further comprises a cover part which surrounds the light source part and reflects the light toward the reflective surface of the reflective part.

4. The display apparatus of claim 3, wherein a portion of the cover part is disposed between the light source part and the display panel.

5. The display apparatus of claim 4, wherein
an angle between an upper surface of the cover part of a light source unit, and an upper surface of the cover part of an adjacent light source unit is greater than zero degree, and
a portion of each of the reflective surfaces of the adjacent light source units is tangent to a curve substantially parallel to the first curvature.

6. The display apparatus of claim 4, wherein a second side of the reflective part opposite to the first side overlaps the cover part of an adjacent light source unit.

7. The display apparatus of claim 6, wherein the reflective part further comprises a recessed portion at the second side thereof, in which the cover part of the adjacent light source unit is accommodated.

8. The display apparatus of claim 3, wherein the reflective part is a single, unitary, indivisible unit.

9. The display apparatus of claim 1, wherein the reflective part further comprises a lower surface which is opposite to the reflective upper surface and curved along a third curvature different from the first curvature of the display panel.

10. The display apparatus of claim 9, wherein a portion of the lower surface of the reflective part contacts a curve substantially parallel to the first curvature.

11. The display apparatus of claim 10, wherein the third curvature of the lower surface of the reflective part is greater than the first curvature of the display panel.

12. The display apparatus of claim 9, further comprising a bottom chassis which accommodates the light source units therein, wherein a portion of the lower surface of the reflective part contacts the bottom chassis.

13. The display apparatus of claim 1, wherein the reflective part further comprises a reflective pattern on the reflective surface.

14. The display apparatus of claim 13, wherein a size and a density of the reflective pattern are changed as the reflective pattern is further away from the light source part.

15. The display apparatus of claim 1, wherein the reflective part further comprises a reflective coating film or a reflective coating material layer on the reflective surface.

16. The display apparatus of claim 1, wherein the reflective part further comprises a metal material.

17. The display apparatus of claim 1, wherein the reflective part has elasticity.

18. The display apparatus of claim 1, wherein the light source part comprises a plurality of light sources which are individually driven to generate the light.

19. The display apparatus of claim 1, wherein the light source units are arranged in a matrix form.

20. A backlight unit of a display apparatus, comprising:
a plurality of light source units which generates and provides light to a curved display panel of the display apparatus, the curved display panel having a first curvature,
wherein each light source unit of the backlight unit comprises:
a reflective part comprising a curved reflective surface facing the curved display panel and having a second curvature different from the first curvature of the curved display panel; and
a light source part which is at a side of the reflective part, and generates the light and provides the generated light to the curved reflective surface facing the curved display panel,
wherein for an imaginary curve parallel to the first curvature of the curved display panel, a portion of the reflective surface of each light source unit is tangent to the imaginary curve parallel to the first curvature of the display panel.

* * * * *